United States Patent
Bucci

(10) Patent No.: US 7,341,318 B2
(45) Date of Patent: Mar. 11, 2008

(54) CIRCULATING FLUID REGULATED BRAKING DEVICE FOR AIR AND LAND VEHICLES

(76) Inventor: Clemar Eleuterio Bucci, Migueletes 863 Piso 6to Of "C", Buenos Aires (AR) 1426

( * ) Notice: Subject to any disclaimer, the term of this patent is extended or adjusted under 35 U.S.C. 154(b) by 0 days.

(21) Appl. No.: 11/010,298

(22) Filed: Dec. 14, 2004

(65) Prior Publication Data
US 2005/0127744 A1  Jun. 16, 2005

(30) Foreign Application Priority Data
Dec. 15, 2003 (AR) ............... P030104638
Nov. 24, 2004 (AR) ............... P040104355

(51) Int. Cl.
*B60T 13/16* (2006.01)

(52) U.S. Cl. ............ 303/10; 188/152; 188/358; 417/221

(58) Field of Classification Search ........... 303/10, 303/116.3, 9.61, 6.01, 52; 188/292, 152, 188/354, 264 P, 264 F, 358, 359, 2 R, 106 R; 417/218

See application file for complete search history.

(56) References Cited

U.S. PATENT DOCUMENTS

| | | | |
|---|---|---|---|
| 1,632,425 A |  | 6/1927 | Yeary et al. |
| 1,768,355 A | * | 6/1930 | Hallett ............... 188/359 |
| 2,583,307 A | * | 1/1952 | Schneider ............ 475/84 |
| 2,832,428 A | * | 4/1958 | Kelley et al. ........... 180/54.1 |
| 2,845,149 A | * | 7/1958 | Stern et al. ........... 188/195 |
| 2,879,867 A | * | 3/1959 | Rike ............... 188/264 F |
| 3,042,155 A | * | 7/1962 | Kelley ............ 188/264 E |
| 3,185,261 A |  | 5/1965 | Campbell et al. |
| 3,264,040 A | * | 8/1966 | Brueder ............ 303/116.3 |
| 3,329,470 A | * | 7/1967 | Warren ............. 303/116.3 |
| 3,441,319 A | * | 4/1969 | Boueil et al. ............ 303/7 |
| 3,519,314 A | * | 7/1970 | Ballard ............ 303/116.3 |
| 3,524,683 A | * | 8/1970 | Stelzer ............ 313/318.05 |
| 3,640,587 A | * | 2/1972 | Milner et al. ........ 303/116.3 |
| 3,702,207 A | * | 11/1972 | Armstrong .......... 303/9.69 |
| 3,740,104 A | * | 6/1973 | Wolf ................ 303/116.3 |
| 4,012,082 A | * | 3/1977 | Doversberger ....... 303/116.3 |
| 4,070,070 A |  | 1/1978 | Eggers |
| 4,125,234 A | * | 11/1978 | Tregre ............... 244/111 |

(Continued)

FOREIGN PATENT DOCUMENTS

DE    201 03 129    5/2001

(Continued)

*Primary Examiner*—Bradley King
*Assistant Examiner*—Mariano Sy
(74) *Attorney, Agent, or Firm*—Albert Bordas, P.A.

(57) ABSTRACT

A circulating fluid regulated braking device for a vehicle includes a piston pump mounted directly on the hub of each vehicle wheel. The pumps mounted on front wheels are connected by pipes to a primary two-way valve, which, in turn, is connected by pipes to a primary storage tank to define a completely independent front wheel brake hydraulic circuit. The pumps mounted on rear wheels are connected by pipes to a secondary two-way valve, which, in turn, is connected by pipes to a secondary storage tank to define a completely independent rear wheel brake hydraulic circuit. A moveable inner body located in each of the primary and secondary two-way valves is linked to a vehicle brake pedal lever.

1 Claim, 3 Drawing Sheets

U.S. PATENT DOCUMENTS

| | | | | |
|---|---|---|---|---|
| 4,363,607 A | * | 12/1982 | Eichele et al. | 417/273 |
| 4,520,841 A | * | 6/1985 | Brand et al. | 137/270 |
| 5,137,100 A | * | 8/1992 | Scott et al. | 180/6.48 |
| 5,340,285 A | * | 8/1994 | Reinartz et al. | 417/221 |
| 6,470,677 B2 | * | 10/2002 | Bailey | 60/418 |
| 6,484,851 B2 | * | 11/2002 | Song | 188/31 |

FOREIGN PATENT DOCUMENTS

FR          1 406 477        7/1965

* cited by examiner

CIRCULATING FLUID REGULATED BRAKING DEVICE FOR AIR AND LAND VEHICLES

BACKGROUND OF THE INVENTION

1. Field of the Invention

The principal object of this patent of invention is a circulating fluid regulated braking device for air and land vehicles, which provides significant advantages resulting from its effective braking action, structural simplicity, low maintenance and the absence of environmental contamination during the braking process of the vehicle.

More particularly, the present invention relates to a device as specified in this patent which has been designed and developed in order to provide all types of air and land vehicles with a simple and highly effective braking device which contributes to avoid accidents caused by malfunction or breakdown attributed to already known braking systems.

2. Description of the Prior Art

It is known that braking consists of applying a fixed surface against a rotating drum or disk, being an integral part of the wheel of the vehicle. Thus, friction holds the rotation of the wheel and consequently produces the gradual stop of the vehicle, thanks to the friction force that comes in contact between the pneumatic tire and the road surface.

In regard to the rotating drum, already known braking systems utilize internal shoes whose surface is applied against the drum, while rotating disks utilize at least two friction pads mounted to each slidable body which are applied to both faces of the disk.

Usually the displacement of the internal shoes—as in the drum brake—or the displacement of the friction pads—as in the disk brake—is produced by means of a pneumatic or hydraulic circuit, controlled by the brake pedal of the vehicle.

Regarding the inconveniences inherent in drum brakes, we can mention, among others, the emission of contaminating particles during the braking process, gradual wear of internal brake pads, great overheating when deceleration is very frequent, brake fade when brake pads are wetted with water or any other fluid, and permanent maintenance—cleaning and adjustment—required by the complete assembly.

Similarly, regarding disk brakes, we can mention some inconveniences such as the emission of contaminating particles during the braking process, gradual wear of friction pads, great overheating when deceleration is very frequent, brake fade when friction pads are wetted with water or another fluid, and permanent maintenance that implies cleaning and adjustment of the complete assembly.

Considering the hydraulic control circuit—either for drum or disk brakes—there is an inconvenience associated with its structural characteristics which implies that frequent maintenance is required due to the loss of fluid in the cylinders mounted on each wheel, or the loss of fluid in other parts of the circuit.

SUMMARY OF THE INVENTION

The inconveniences recited in the foregoing can be avoided by a circulating fluid regulated braking device for air and land vehicles as specified in this invention, which maintains an effective braking action still in intense rainy weather. Further advantages of this device include structural simplicity, low maintenance and the total absence of emission of contaminating particles during the braking process of the vehicle.

The aforementioned benefits are a direct consequence of the particular combination and structure of the elements that compose the circulating fluid regulated braking device for air and land vehicles. Said device comprises an oil or similar fluid boost pump mounted on a steady support plate adjacent to each vehicle wheel which can be operated by means of a toothed wheel that engages a second toothed wheel being an integral part of the hub of the vehicle wheel.

The pumps mounted on the front wheels of the vehicle are connected by means of pipes, to a primary two-way valve which, in turn, is connected by means of pipes to a primary oil or similar fluid storage tank, thus constituting a completely independent front wheel brake hydraulic circuit.

Furthermore, the pumps mounted on the rear wheels of the vehicle are connected by means of pipes, to a secondary two-way valve which, in turn, is connected by means of pipes to a secondary oil or similar fluid storage tank, thus constituting a completely independent rear wheel brake hydraulic circuit.

The moveable inner body of the foregoing primary and secondary two-way valves is linked to the brake pedal lever of the vehicle, so that if the pedal is pressed, both brake hydraulic circuits will operate simultaneously and independently.

In one variant of the preferred embodiment the present device comprises the oil or similar fluid boost pump whose pistons are arranged preferably in a radial arrangement. Said pump is mounted directly on the hub of each vehicle wheel adjacent thereto.

The pump can be actuated by means of an eccentric cylindrical body forming part of the hub of the vehicle wheel whose rotation produces the alternate motion of the pistons intended to pump oil.

In order to clarify the aforementioned advantages and to facilitate better understanding of the structure, constitution and operation of the invented circulating fluid regulated braking device for air and land vehicles, an exemplary preferred embodiment is below described and illustrated schematically without being drawn to scale. It is expressly clarified that the purpose of the example is to describe and illustrate the basic concept on which the invention is based, thus the protective scope of the present invention may not be limited or restricted in any way whatsoever.

DETAILED DESCRIPTION OF THE PREFERRED EMBODIMENT

Figure 1:
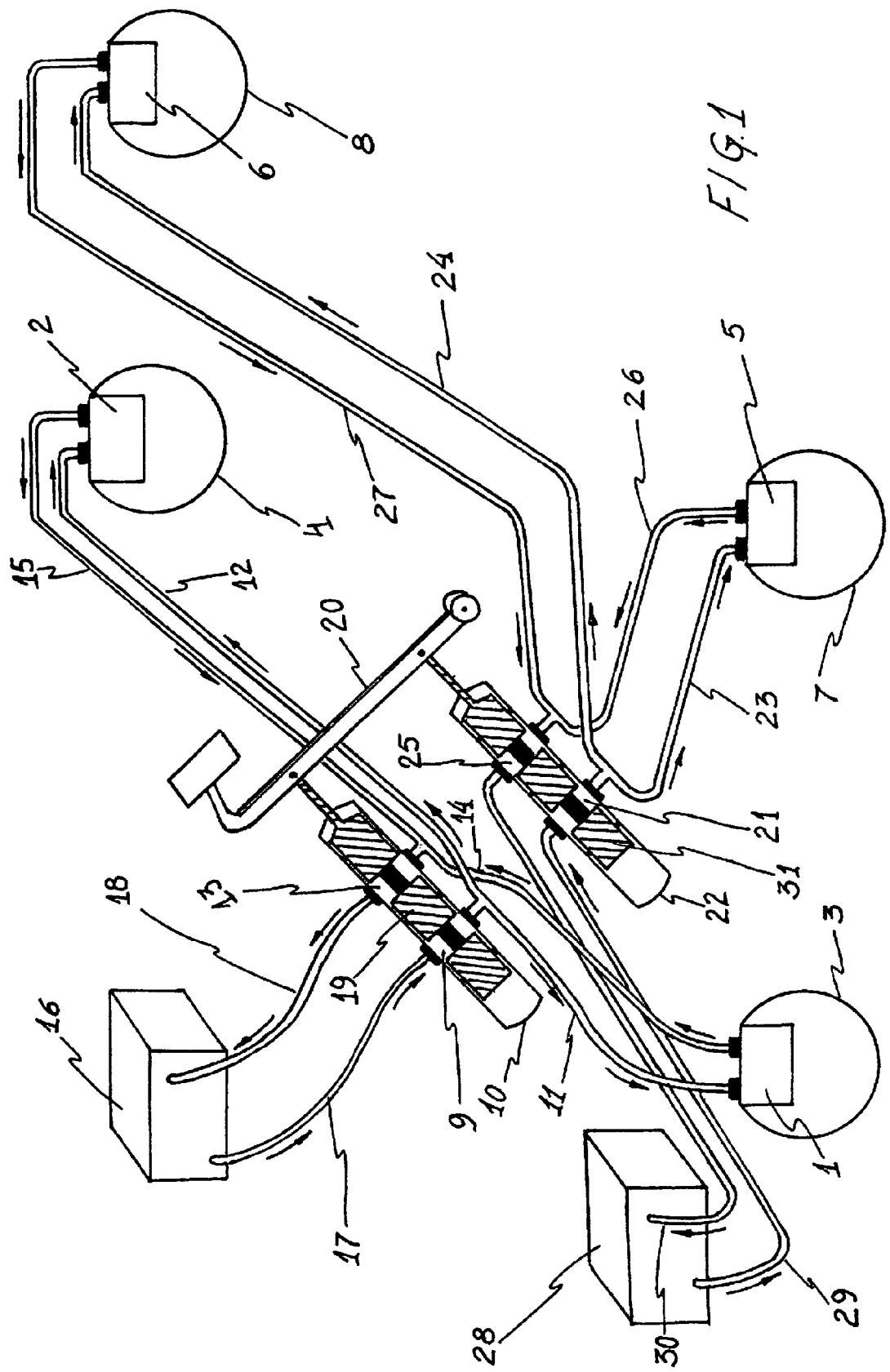
FIG. 1 depicts a diagram of the circulating fluid regulated braking device according to the present invention.

According to the exemplary embodiment selected for describing the circulating fluid regulated braking device invented for air and land vehicles and throughout the figures of drawings, where the same element or structure constituting the set appears in more than one Figure of the drawing, the same reference number is applied thereto.

Referring now to FIG. 1, the circulating fluid regulated braking device according to the present invention comprises oil boost pumps 1 and 2, respectively mounted on front wheels 3 and 4, and oil boost pumps 5 and 6, respectively mounted on rear wheels 7 and 8. Pumps 1 and 2 inlets are connected to the first way 9 outlet of the primary valve 10, by means of pipes 11 and 12, while same pumps 1 and 2 outlets are connected to the second way 13 inlet of said primary valve 10 by means of pipes 14 and 15.

It may be observed that the inlet of the first way 9 is connected to a primary oil or similar fluid storage tank 16, by means of pipe 17, while the outlet of the second way 13 is connected to said primary tank 16, by means of pipe 18. The moveable inner body 19 of the primary valve 10 is linked to the brake pedal lever 20 of the vehicle, so that if the pedal is pressed, the brake hydraulic circuit of the front wheels will operate independently.

As seen in the above figure, pumps 5 and 6 inlets are connected to the outlet of the first way 21 of the secondary valve 22, by means of pipes 23 and 24, while same pumps 5 and 6 outlets are connected to the inlet of the second way 25 of said secondary valve 22, by means of pipes 26 and 27. It may also be observed that the inlet of the first way 21 is connected to a secondary oil or similar fluid storage tank 28, by means of pipe 29, while the outlet of the second way 25 is connected to said secondary tank 28 by means of pipe 30. The moveable inner body 31 of the secondary valve 22 is linked to the brake pedal lever 20 of the vehicle, so that if the pedal is pressed, the brake hydraulic circuit of the rear wheels will operate independently.

Figure 2:
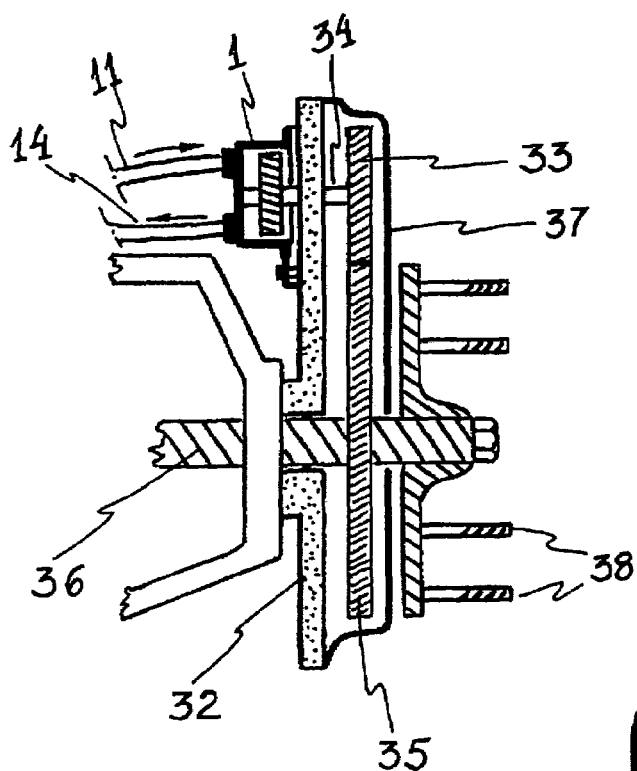
FIG. 2 depicts a cutaway view of the assembly set of a front wheel and respective pump thereof according to the exemplary embodiment of the present invention.

FIG. 2 depicts a cutaway view of the assembly set of a front wheel of the vehicle where the oil or similar fluid gear pump 1 is shown as mounted on a steady support plate 32. The toothed wheel 33 mounted on the shaft 34 of pump 1 engages another toothed wheel 35 being an integral part of the hub 36 of the vehicle wheel. The housing 37 keeps the wheels set 33 and 35 isolated in order to prevent them from the action of water and dust particles and to maintain a correct lubrication. Studs 38 pass through wheel hub orifices of the vehicle, thus permitting the fastening of the wheel by means of each nut, not shown in FIG. 2.

Referring to the front-wheel drive, the rotation of the hub 36 produces the vehicle motion, also transmitting said rotation to pump 1 through the geared wheels 35 and 33. The motion of pump 1 pumps the oil through pipe 14, driving it to the circuit illustrated in the above figure, and then returning to pump 1 through pipe 11.

When the pedal brake is in the rest position, oil circulates freely but when the pedal is actuated, said circulation is gradually blocked due to the closure of the ways of the primary valve 10. This way, the rotation of the toothed wheels 33 and 35 and the hub 36—being an integral part of the wheel—is blocked by hydraulic effect, thus producing the vehicle stop due to the action of the friction force between the tire and the road surface.

Figure 3:
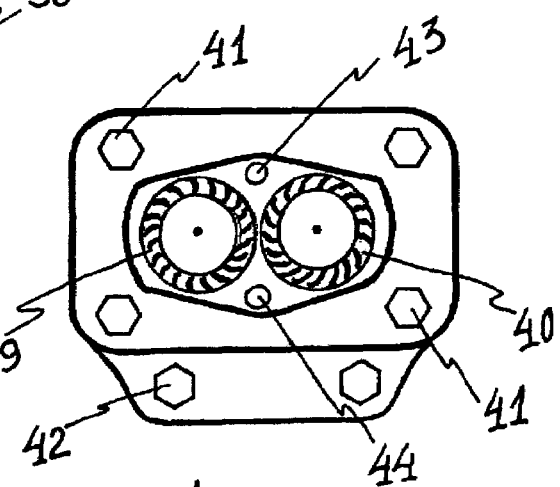
FIG. 3 depicts a cutaway view of the pump illustrated in the above figure.

FIG. 3 depicts a cutaway view of the oil or similar fluid pump showing inner gears 39 and 40, screws 41 of the pump cap, fastening screws 42 of the pump to the steady support plate, as well as inlet 43 and outlet 44, which are connected to pipes 11 and 14 respectively.

Figure 4:
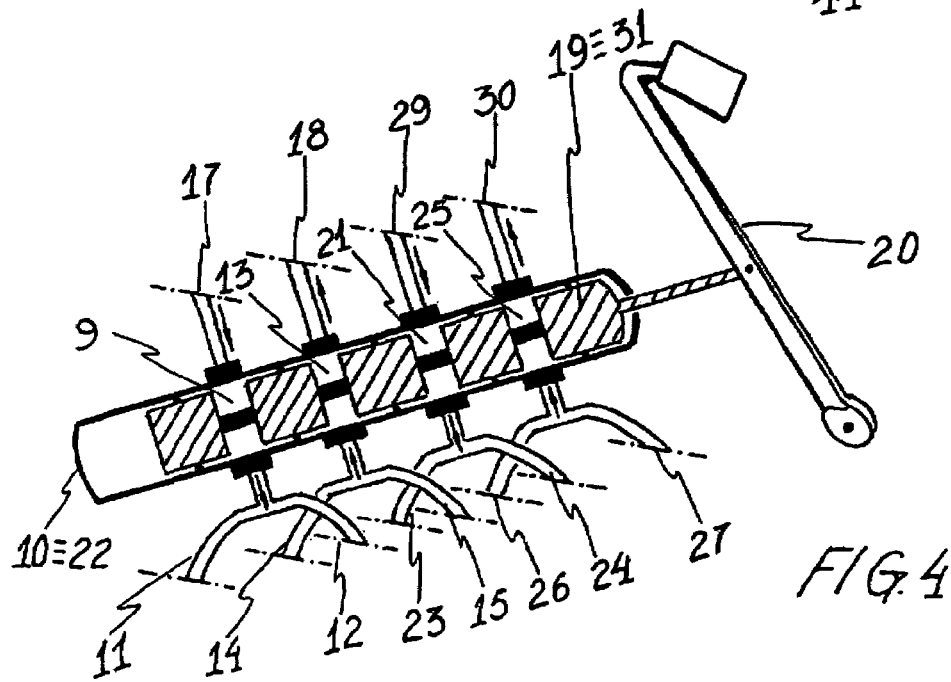
FIG. 4 depicts a diagram of a four-way valve of the circulating fluid regulated braking device, according to a preferred embodiment variant.

FIG. 4 depicts a diagram of a four-way valve of the circulating fluid regulated braking device wherein the same reference numbers are used to identify same elements illustrated in FIG. 1. In this preferred embodiment variant, only one four-way valve is actuated by the lever 20 of the vehicle brake pedal, thus maintaining the independency of brake hydraulic circuits of the front and rear wheels.

Figure 5:
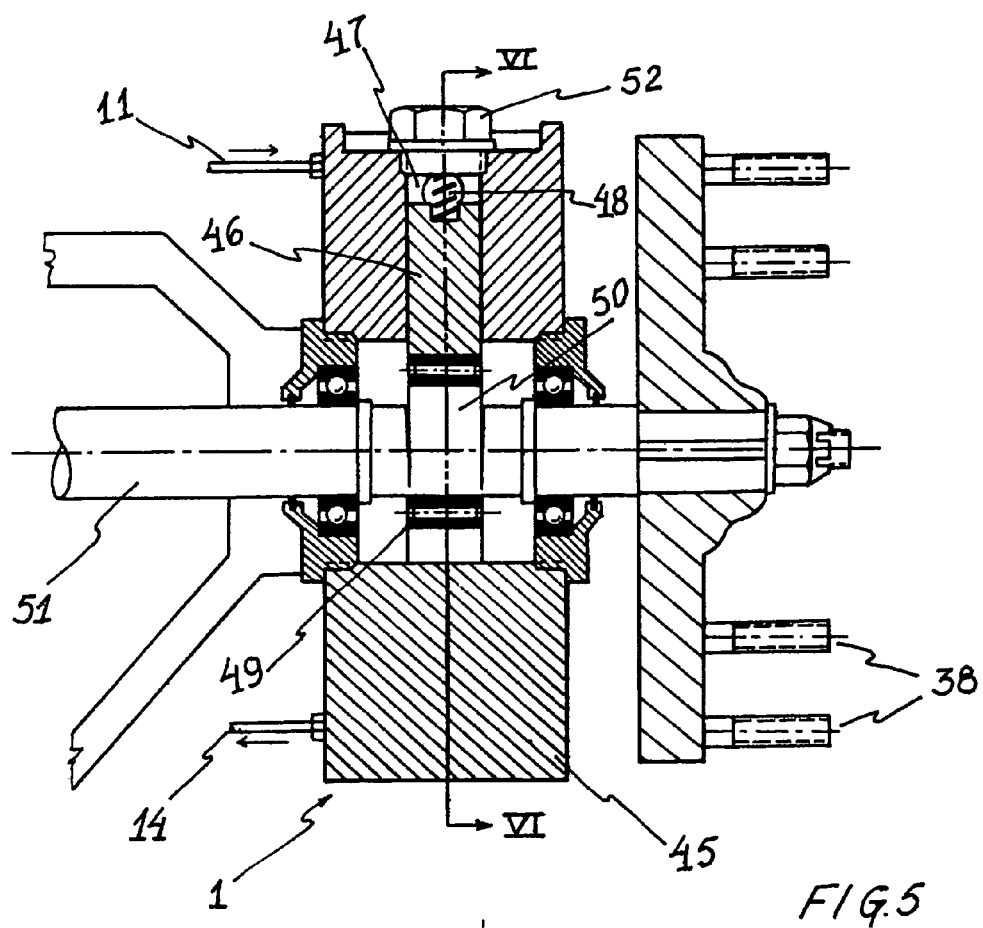
FIG. 5 depicts a cutaway view of the assembly set of a front wheel and respective pump thereof according to the preferred variant embodiment of the present invention.

FIG. 5 depicts a cutaway view of the assembly set of a front wheel of the vehicle wherein the oil or similar fluid pump 1 can be seen. Said front wheel comprises a housing 45—being an integral part of the vehicle suspension set—wherein there is a plurality of radial pistons 46 housed in each cylindrical cavity 47. The outer face of said pistons receives the thrust of the spring 48, while their inner face is in permanent contact with the outer ring of the bearing 49, preferably a roller bearing, mounted on the eccentric cylindrical body 50 forming part of the hub 51 of the vehicle wheel. Cylindrical cavities 47 are hermetically sealed by means of screws 52.

FIG. 5 also shows oil inlet and outlet pipes 11 and 14 respectively, according to the hydraulic circuit of the braking device illustrated in FIG. 1.

Figure 6:
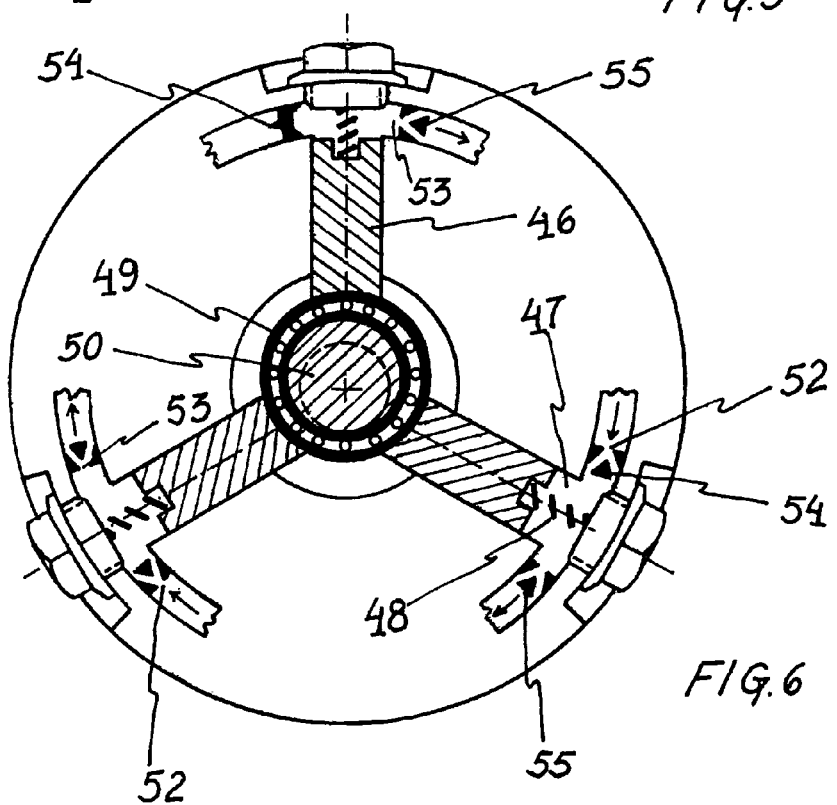
FIG. 6 depicts a cutaway view according to the scheme VI-VI illustrated in FIG. 5.

FIG. 6 depicts a cutaway view according to the scheme VI-VI illustrated in FIG. 5, wherein radial pistons 46 are housed in cylindrical cavities 47. As hereinabove mentioned, the inner face of said pistons is in permanent contact—due to the action of the springs 48—with the outer ring of the bearing 49 which is mounted on the eccentric cylindrical body 50 forming part of the hub 51 of the vehicle wheel.

Referring to the front-wheel drive, the rotation of the hub 51 not only moves the vehicle but also produces the rotation of the eccentric body 50 which transmits an alternate motion to the radial pistons 46. This way, during the vehicle motion, the oil in each cylindrical cavity 47 enters through the orifice 52 and exits through the orifice 53 alternately. It may be observed that check valves 54 are mounted on orifices 52, while check valves 55 are mounted on orifices 53.

Both channels, not shown in the above Figure, communicate the orifices 52 with the inlet pipe 11, and the orifices 53 with the outlet pipe 14, thus permitting the continuous circulation of oil through the hydraulic circuit of the device illustrated in FIG. 1.

When the pedal brake is in the rest position, oil circulates freely but when the pedal is actuated, said circulation is gradually blocked due to the closure of the ways of the primary valve 10. Consequently, the rotation of the eccentric body 50 and the hub 51—being an integral part of the wheel—is blocked by hydraulic effect, thus producing the vehicle stop due to the action of the friction force between the tire and the road surface.

The protective scope of the present patent of invention is defined in the following claims in accordance with the above described exemplary embodiment and variants thereof.

The invention claimed is:

1. A circulating fluid regulated braking device for a vehicle, comprising:
   A) a first boost pump (1) having inlet pipe (11) and outlet pipe (14), said first boost pump (1) is mounted onto front wheel (3) of said vehicle;
   B) a second boost pump (2) having inlet pipe (12) and outlet pipe (15), said second boost pump (2) is mounted onto front wheel (4) of said vehicle;
   C) a third boost pump (5) having inlet pipe (23) and outlet pipe (26), said third boost pump (5) is mounted onto rear wheel (7) of said vehicle;

D) a fourth boost pump (6) having inlet pipe (24) and outlet pipe (27), said fourth boost pump (6) is mounted onto rear wheel (8) of said vehicle;

E) a sole four-way valve (10=22) that defines an independent front brake circuit and an independent rear brake circuit, said sole four-way valve (10=22) comprises inlet pipe (17), outlet pipe (18), inlet pipe (29), and outlet pipe (30), said independent front brake circuit includes said inlet pipe (17) connected to said inlet pipe (11) and said inlet pipe (12) via way (9) of said sole four-way valve (10=22), and said outlet pipe (18) connected to said outlet pipe (14) and said outlet pipe (15) via way (13) of said sole four-way valve (10=22), said independent rear brake circuit includes said inlet pipe (29) connected to said inlet pipe (23) and said inlet pipe (24) via way (21) of said sole four-way valve (10=22), and said outlet pipe (30) connected to said outlet pipe (26) and said outlet pipe (27) via way (25) of said sole four-way valve (10=22), said independent front brake circuit further includes tank (16) connected to said inlet pipe (17) and said outlet pipe (18), said independent rear brake circuit further includes tank (28) connected to said inlet pipe (29) and said outlet pipe (30), each of said boost pump (1), (2), (5), and (6) comprises at least three radially displaced pistons (46) that are each housed in a corresponding respective hermetically sealed cylindrical cavity (47) that forms part of a housing (45), each of said pistons (46) has an inner face and an outer face, each of said cylindrical cavity (47) is equally distant from each other and each of said cylindrical cavity an inlet orifice and an outlet orifice that connect to said inlet pipe (11) and said outlet pipe (14) for said first boost pump (1), said inlet pipe (12) and said outlet pipe (15) for said second boost pump (2), said inlet pipe (23) and said outlet pipe (26) for said third boost pump (5), and said inlet pipe (24) and said outlet pipe (27) for said fourth boost pump (6), said outer face of each said pistons (46) contacts a helicoidal spring (48), said inner face of each said pistons (46) permanently contacts an outer ring of a roller bearing (49), said roller bearing (49) being mounted on an eccentric cylindrical body (50) that forms part of a hub (51) for each corresponding said front wheel (3), said front wheel (4), said rear wheel (7), and said rear wheel (8), said sole four-way valve (10=22) further comprises a moveable inner body (19=31) that is linked to a brake pedal lever (20) of said vehicle that permits continuous circulation of said fluid through said independent front and rear brake circuits when said brake pedal lever is at rest; and F) means to produce said vehicle to a stop comprising said brake pedal lever (20) to gradually block said continuous circulation throughout said independent front and rear brake circuits, whereby said continuous circulation is gradually blocked due to the closure of said ways (9), (13), (21), and (25) by said moveable inner body (19=31).

\* \* \* \* \*